United States Patent
Zhao et al.

(10) Patent No.: US 12,391,273 B2
(45) Date of Patent: Aug. 19, 2025

(54) METHOD AND COMPUTER SYSTEM FOR CONTROLLING THE MOVEMENT OF A HOST VEHICLE

(71) Applicant: Aptiv Technologies AG, Schaffhausen (CH)

(72) Inventors: Kun Zhao, Düsseldorf (DE); Ido Freeman, Düsseldorf (DE); Thomas Kurbiel, Essen (DE)

(73) Assignee: Aptiv Technologies AG, Schaffhausen (CH)

( * ) Notice: Subject to any disclaimer, the term of this patent is extended or adjusted under 35 U.S.C. 154(b) by 254 days.

(21) Appl. No.: 18/118,245

(22) Filed: Mar. 7, 2023

(65) Prior Publication Data

US 2023/0286535 A1 Sep. 14, 2023

(30) Foreign Application Priority Data

Mar. 14, 2022 (GB) ..................... 2203519

(51) Int. Cl.
*B60W 60/00* (2020.01)
*B60W 30/18* (2012.01)
*B60W 40/072* (2012.01)

(52) U.S. Cl.
CPC .... *B60W 60/001* (2020.02); *B60W 30/18163* (2013.01); *B60W 40/072* (2013.01); *B60W 2552/53* (2020.02)

(58) Field of Classification Search
CPC ........... B60W 60/001; B60W 60/0011; B60W 30/18163; B60W 2552/53; B60W 40/072
See application file for complete search history.

(56) References Cited

U.S. PATENT DOCUMENTS

| | | | |
|---|---|---|---|
| 11,176,384 B1* | 11/2021 | Yang | H04N 23/54 |
| 2019/0204842 A1* | 7/2019 | Jafari Tafti | G06N 3/08 |
| 2019/0346844 A1 | 11/2019 | Chen et al. | |
| 2020/0039520 A1 | 2/2020 | Misu et al. | |
| 2020/0039521 A1 | 2/2020 | Misu et al. | |
| 2020/0114924 A1 | 4/2020 | Chen et al. | |
| 2021/0158696 A1* | 5/2021 | McNew | G08G 1/207 |
| 2022/0083065 A1* | 3/2022 | Liu | B60W 60/001 |

OTHER PUBLICATIONS

Combined Search and Examination Report issued by the UK Patent and Trademark Office in connection with International Application No. GB2203519.0, dated Sep. 15, 2022.

* cited by examiner

*Primary Examiner* — Erin M Piateski
*Assistant Examiner* — Hajar Hassaniardekani
(74) *Attorney, Agent, or Firm* — Harness, Dickey & Pierce, P.L.C.

(57) ABSTRACT

A method is provided for controlling the movement of a host vehicle. Lane data related to road items are determined from a data source, and object data acquired from objects are determined via a sensor system. The road items and the objects are located in an external environment of the host vehicle. A machine-learning algorithm is fed with the lane data and the object data to generate a set of controlling functions for controlling the movement of the host vehicle by performing the steps of: classifying a predefined set of maneuvers for the host vehicle based on the lane data and the object data, and determining a set of controlling functions related to kinematics of the host vehicle. The movement of the host vehicle is controlled based on the classified maneuvers and the determined controlling functions.

12 Claims, 7 Drawing Sheets

METHOD AND COMPUTER SYSTEM FOR CONTROLLING THE MOVEMENT OF A HOST VEHICLE

CROSS-REFERENCE TO RELATED APPLICATION

Figure 1:
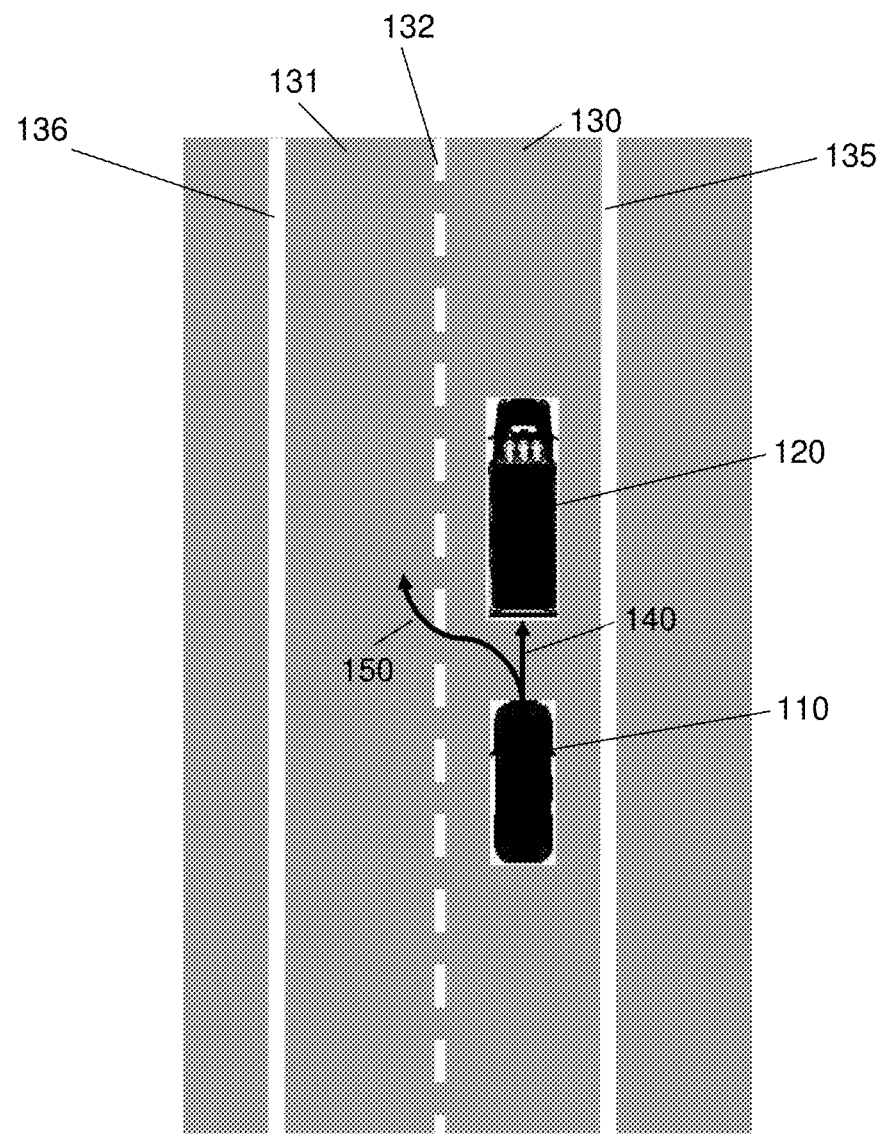

This application claims the benefit of Great Britain patent application serial number GB2203519.0 filed on Mar. 14, 2022. The entire contents of which are hereby incorporated by reference herein.

FIELD

The present disclosure relates to a computer implemented method and a computer system for controlling the movement of a host vehicle.

BACKGROUND

The control of longitudinal and lateral movements of modern vehicles is usually supported by advanced driver assistance systems (ADAS), for example by adaptive cruise control (ACC) supporting the longitudinal control and by lane keeping assistance (LKA) supporting the lateral control. Such systems mostly rely on the perception of the external environment of the vehicle which is provided, for example, by visual devices like cameras and/or by radar and/or Lidar sensors.

The perception of the vehicle's environment which is provided as output from such devices is traditionally used by a trajectory planner or controller. Such a trajectory planner is able to model the movements of a host vehicle in which the perception devices are installed and the movements of other relevant vehicles and/or objects in the environment of the host vehicle. The goal of the trajectory planning is to provide a safe and comfortable future trajectory for the host vehicle. However, trajectory planning may be a challenging task. For example, noisy input data needs to be controlled by specific rules which have to be implemented for providing a stable trajectory in spite of the noisy data.

A traditional approach for trajectory planning is based on the dynamic properties of all relevant objects, e.g. their position, velocity and acceleration which may be determined via sensors, in order to predict their individual movements based on physical laws. However, commonly used methods for trajectory planning may be computationally expensive and/or inaccurate.

Accordingly, there is a need for a method and a system which directly provide reliable parameters for controlling the movement of a host vehicle.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for controlling the movement a host vehicle. According to the method, lane data related to road items are determined from a data source, and object data acquired from objects are determined via a sensor system. The road items and the objects are located in an external environment of the host vehicle. A machine-learning algorithm is fed with the lane data and the object data to generate a set of controlling functions for controlling the movement of the host vehicle by performing the steps of: classifying a predefined set of maneuvers for the host vehicle based on the lane data and the object data, and determining a set of controlling functions related to kinematics of the host vehicle. The movement of the host vehicle is controlled based on the classified maneuvers and the determined controlling functions.

The lane data may refer to the lane in which the vehicle is currently moving and/or to right and left neighbouring lanes if such lanes are actually present and available. The lane data may therefore describe the course of one or more of these lanes. Hence, the road items which are related to the lane data may include e.g. lane markings or road boundaries following the course of the lane. The road items may also be detected by the sensor system, i.e. in a similar manner as the objects for which the object data is acquired. Alternatively, the lane data may be acquired from a map which may be available for the intended route of the vehicle.

The machine-learning algorithm may be implemented via an artificial neural network which may include an encoder and respective decoders for the classification task and for the regression task. That is, both steps or tasks, i.e. classifying a predefined set of maneuvers and determining the set of controlling functions, may use the same common encoder.

The predefined set of maneuvers for the host vehicle may relate to the longitudinal and lateral directions with respect to the host vehicle, wherein the longitudinal direction is defined by a longitudinal axis of the host vehicle. The longitudinal maneuvers may refer to acceleration, deceleration and keeping the speed of the host vehicle, whereas the lateral maneuvers may refer to keeping the lane, lane change to the right and lane change to the left.

The controlling functions related to the kinematics of the host vehicle may include control parameters of acceleration and steering angle, parameters of a planned curvature or parameters for a planned trajectory of the host vehicle, for example. The acceleration and the steering angle as well as the planned curvature or the planned trajectory may be represented by the continuous functions, e.g. by polynomials having a predefined order.

Since the method applies a machine-learning algorithm to the entirety of lane data and object data instead of applying physical laws to individual objects in the environment of the host vehicle, the information required for controlling the movement of the host vehicle may be available more directly with reduced computational effort once the machine-learning algorithm is trained.

In addition, a so-called "multi-modality problem" may be overcome which refers to the fact that drivers of the vehicle may exhibit a different behaviour regarding driving style. In the same driving situation, for example, one driver may prefer decelerating the host vehicle and keeping the lane if a further vehicle occurs in front of the host vehicle, whereas another driver may prefer a lane change to the left and accelerating the vehicle in the same driving situation. Hence, controlling the movement of the host vehicle and predicting its future trajectory may not only depend on the perception data, i.e. the lane data and the object data, but also on characteristics of the actual driver of the vehicle. If proper training information being related to the specific driver is available for the machine-learning algorithm, the method may also be able to overcome the multi-modality problem by adapting the machine-learning algorithm to the characteristics of the driver.

Moreover, the machine-learning algorithm does not only perform a regression task of determining optimum values for defining the controlling functions related to the kinematic parameters, but it also performs a classification task regarding the predefined set of maneuvers which may include a respective probability value for each of the maneuvers for a certain point in time. For example, the machine-learning algorithm may not only provide a sequence of optimum values for acceleration and steering angle of the host vehicle for points in time in the near future, but in addition recommended maneuvers for the host vehicle with respect to the longitudinal and lateral directions.

The result of the classifying step may be connected to the step of determining the controlling functions and/or of actually controlling the movement of the vehicle in different ways. With respect to a longitudinal axis of the vehicle, for example, the most probable maneuver regarding a longitudinal direction and a lateral direction, respectively, may be selected and used as an input for determining the controlling functions. Alternatively, a maneuver predicted by the classifying step, i.e. the most probable maneuver, may be compared with an external input for the maneuver to be performed, e.g. provided by a driver of the vehicle, in order to decide which maneuver may be used as an input for determining the controlling functions. The connection between the result of the classifying step and the step of determining the controlling functions and/or the actual controlling step may improve the reliability and safety of a future trajectory of the host vehicle which may be achieved by applying the output of the method.

The controlling functions may be continuous functions, i.e. mathematical functions that can be expressed in closed form, e.g. as polynomials, and the application of such continuous functions may reduce the required computational effort. In addition, the continuous functions may allow e.g. determining a value for the kinematic parameters like acceleration and steering angle at any point in time, i.e. regardless whether an actual perception of the environment via sensor data will be available for that specific point in time.

According to an embodiment, the step of determining the set of controlling functions, i.e. the regression task, may include predicting control parameters of an acceleration and of a steering angle for the host vehicle. In other words, the kinematics of the host vehicle may be represented by the acceleration and the steering angle, i.e. by two parameters only, for the present embodiment. The controlling functions which are to be determined by the regression task may be represented by a respective second order polynomial. In this case, the coefficients of the respective polynomials may be determined in order to define continuous functions in time.

According to another embodiment, the step of determining the set of controlling functions, i.e. the regression task, may include predicting parameters of a planned curvature for the host vehicle. The planned curvature refers to the future curvature of a predicted trajectory for the host vehicle. For this embodiment, the controlling function may be represented by a third order polynomial. Alternatively, the regression task may include predicting parameters of a planned trajectory for the host vehicle, i.e. instead of the planned curvature. In this case, the controlling function may be represented by a fifth order polynomial.

For all embodiments specifying the regression task, one or two kinematic parameters may be considered only for the regression task. If the continuous functions are represented by respective polynomials, a low computational effort is required, and the parameters to be regressed may be assigned to respective layers of the machine-learning algorithm or neural network.

According to a further embodiment, the data source for determining the lane data may include the sensor system. Hence, the sensor system may be the only source being required for determining the input data for the machine-learning algorithm. Alternatively or additionally, the data source for determining the lane data may include a predetermined map. In contrast, the object data acquired from objects in the external environment of the host vehicle are further determined by using the sensor system. The lane data, however, may be independent from the perception capability of the sensor system if a predetermined map is used as the data source.

According to a further embodiment, common ground truth data may be applied for training the machine-learning algorithm in order to classify the predefined set of maneuvers and to determine the controlling functions, e.g. continuous functions in time related to the kinematics of the host vehicle. The common ground truth data may be acquired as data recorded for the host vehicle over a predetermined time period. For recording this data for the host vehicle, the sensor system may be used at least partly which may include a visual sensor and/or a radar sensor and/or a Lidar sensor of the vehicles. Furthermore, additional pre-classified data may be generated by pre-classifying the predefined set of maneuvers using the data recorded for the host vehicle. The additional pre-classified data may be applied for the training of determining the continuous functions.

Although two different tasks are performed by the machine-learning algorithm simultaneously, i.e. the classification task of classifying the predefined maneuvers and the regression task of determining the controlling functions, these two tasks are linked to each other in order to provide information regarding the future kinematics or trajectory of the host vehicle. Therefore, the common ground truth data reflects the linkage of the two tasks in a realistic manner. Moreover, if the common ground truth data is recorded or logged over the predetermined time period for the host vehicle, this ground truth data describes and represents the actual behaviour of a driver of the vehicle. Hence, the above described multi-modality problem, i.e. a different behaviour of different drivers for the same driving situation, may be overcome by recording or logging the common ground truth data over the predetermined time period.

Moreover, the multi-modality problem may be additionally facilitated by deriving the additional pre-classified data from the data which are recorded or logged over the predetermined time period for the host vehicle. For example, a probability value may be provided for each point in time and for each of predefined maneuvers in order to define the additional pre-classified data. Moreover, each of the maneuvers may be "given" separately to the machine-learning algorithm during the training phase in order to "ask" for the respective controlling function in time for the respective control parameter, e.g. for the steering angle and for the acceleration of the host vehicle.

The additional pre-classified data may be given to the machine-learning algorithm during the training phase such that each training sample comprised by the pre-classified data has one ground truth modality only which helps the regression task of determining the controlling functions to converge. Such a training procedure is called "teacher forcing" since e.g. coefficients for layers used within the machine-learning algorithm or neural network may be learned for a predefined classification of the maneuvers. However, the additional ground truth data or additional pre-classified data should not "leak" to the classification task during the training. Therefore, the additional pre-classified data is provided to the regression task only, e.g. by providing the data to the regression decoder only if a computer system is applied having separate decoders for the classification and regression tasks.

Moreover, the classification task and the regression task may be related to respective loss functions during the training of the machine-learning algorithm. That is, there may be a loss function for the classification task and another loss function for the regression task, for example. For training the machine-learning algorithm, these loss functions may be minimized based on applying common perception data and the additional pre-classified data e.g. to the encoder and decoder system, for example, which perform the classification task and the regression task, respectively, and based on a comparison of the output of the machine-learning algorithm with the respective ground truth data.

The road items may include lane markings, road boundaries and/or guard rails. For example, the lane markings may be monitored by the sensor system in order to track the course of a lane in which the vehicle is currently moving. Additionally, the course of the current lane may additionally be verified by tracking road boundaries and/or guard rails. This facilitates the tracking of the course of the lane. The tracked road items may be represented by a third order polynomial in a vehicle coordinate system having the longitudinal axis and the lateral axis as coordinate axes. That is, monitoring the road items in time may allow for representing the monitored road items, e.g. lane markings, also by continuous functions in time. Hence, monitoring the lane markings may require a low computational effort for the present embodiment.

According to another embodiment, the object data may include predefined physical properties of the objects. Such physical properties may be the position, the velocity or the type of external objects in the environment of the host vehicle. That is, the term "predefined physical properties" refers to preselecting the kind of physical properties to be monitored for the other objects, i.e. the external objects in the environment of the vehicle. If more than one physical property of the objects is represented by the object data, the reliability of the kinematic parameters and of the corresponding controlling functions may be improved for controlling the movement of the host vehicle.

According to a further embodiment, the predefined set of maneuvers for the host vehicle may include a lane change to the left, keeping the lane and a lane change to the right as lateral maneuvers, and acceleration, keeping speed and deceleration as longitudinal maneuvers. The set of maneuvers may therefore include three lateral maneuvers and three longitudinal maneuvers for this embodiment. Since this set of six predefined maneuvers has a well-defined relationship to kinematic parameters of the host vehicle, controlling the host vehicle may be facilitated by using this predefined set of maneuvers.

In another aspect, the present disclosure is directed at a computer system, said computer system being configured to carry out several or all steps of the computer implemented method described herein.

The computer system is communicatively coupled to a sensor system for providing object data acquired from objects. The computer system is further provided with lane data related to road items and determined from a data source, wherein the road items and the objects are located in an external environment of a host vehicle. The computer system further comprises a machine-learning algorithm which is fed with the lane data and the object data to generate a set of controlling functions for controlling the movement of the vehicle by: a classification decoder classifying the predefined set of maneuvers for the host vehicle based on the lane data and the object data, and by a regression decoder determining the set of controlling functions related to kinematics of the host vehicle. In addition, the computer system comprises a vehicle control unit configured to control the movement of the host vehicle based on the classified maneuvers and the determined controlling functions.

That is, the computer system according to the disclosure includes the machine learning algorithm and two decoders for performing the steps as described above for the corresponding method. Therefore, the benefits, the advantages and the disclosure as described above for the various embodiments of the method are also valid for the computer system.

According to an embodiment, the machine-learning algorithm may include an encoder which is used when classifying the predefined set of maneuvers and determining the set of controlling functions.

As described above, common ground truth data may be used for the training of the classification task and of the regression task, wherein the common ground truth data are related to corresponding input data or labels for the common encoder. On the other hand, the concept of "teacher forcing" as described above may be used for training the classification task and the regression task.

The sensor system may include a visual sensor and/or a radar sensor and/or a Lidar sensor. Hence, the sensor system may rely on a sensor which may already be available in a vehicle. This may reduce the cost required for the computer system configured to perform the method.

The sensor system may include a visual sensor only for determining the lane data and for determining the object data. This may reduce the cost for the sensor system, e.g. in comparison to a sensor system including a Lidar sensor.

The computer system may further comprise a processing unit, at least one memory unit and at least one non-transitory data storage. The non-transitory data storage and/or the memory unit may comprise a computer program for instructing the computer to perform several or all steps or aspects of the computer implemented method described herein.

As used herein, the term processing unit may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

In another aspect, the present disclosure is directed at a vehicle which includes the computer system as described above.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
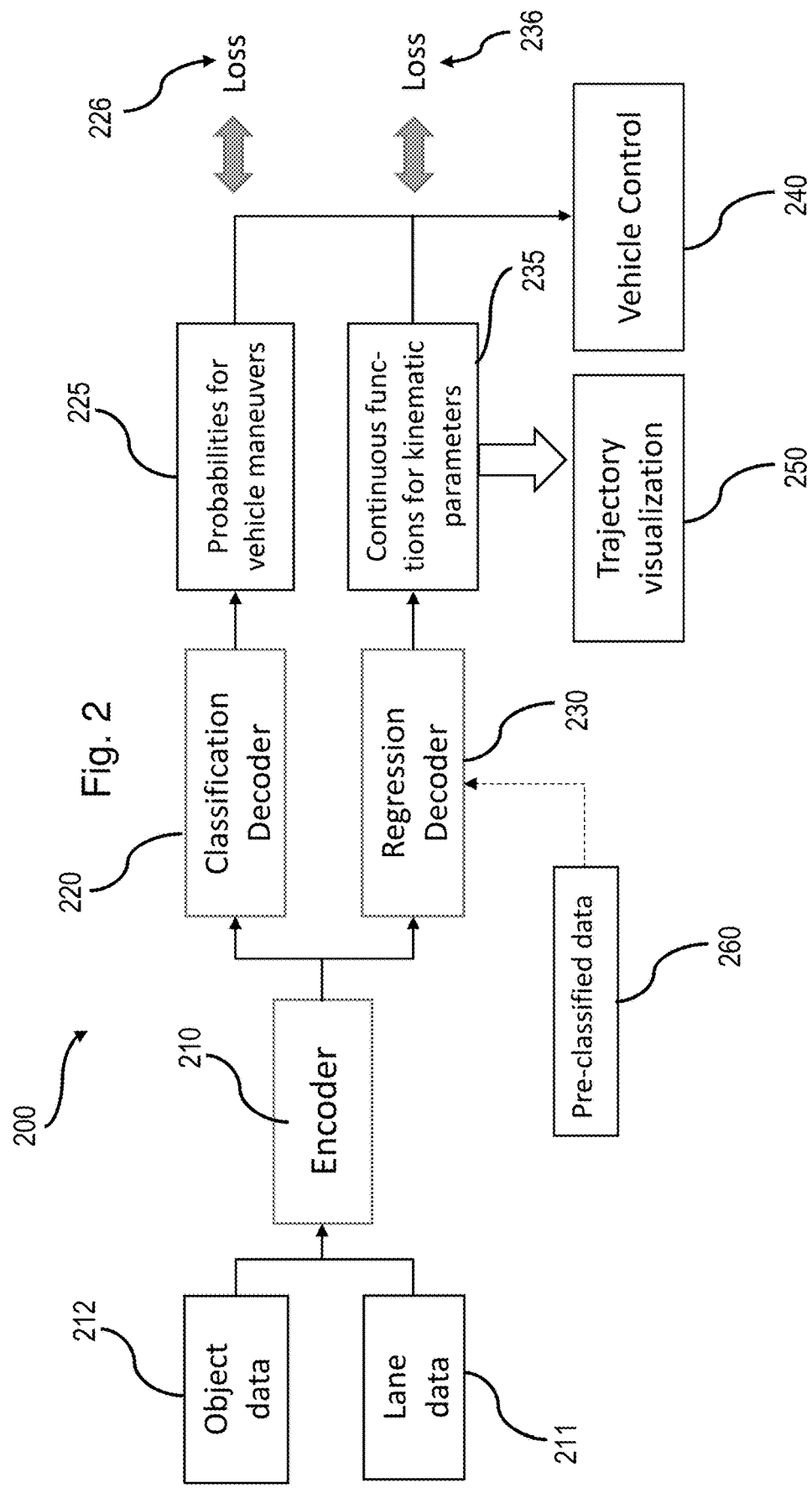
Figure 3:
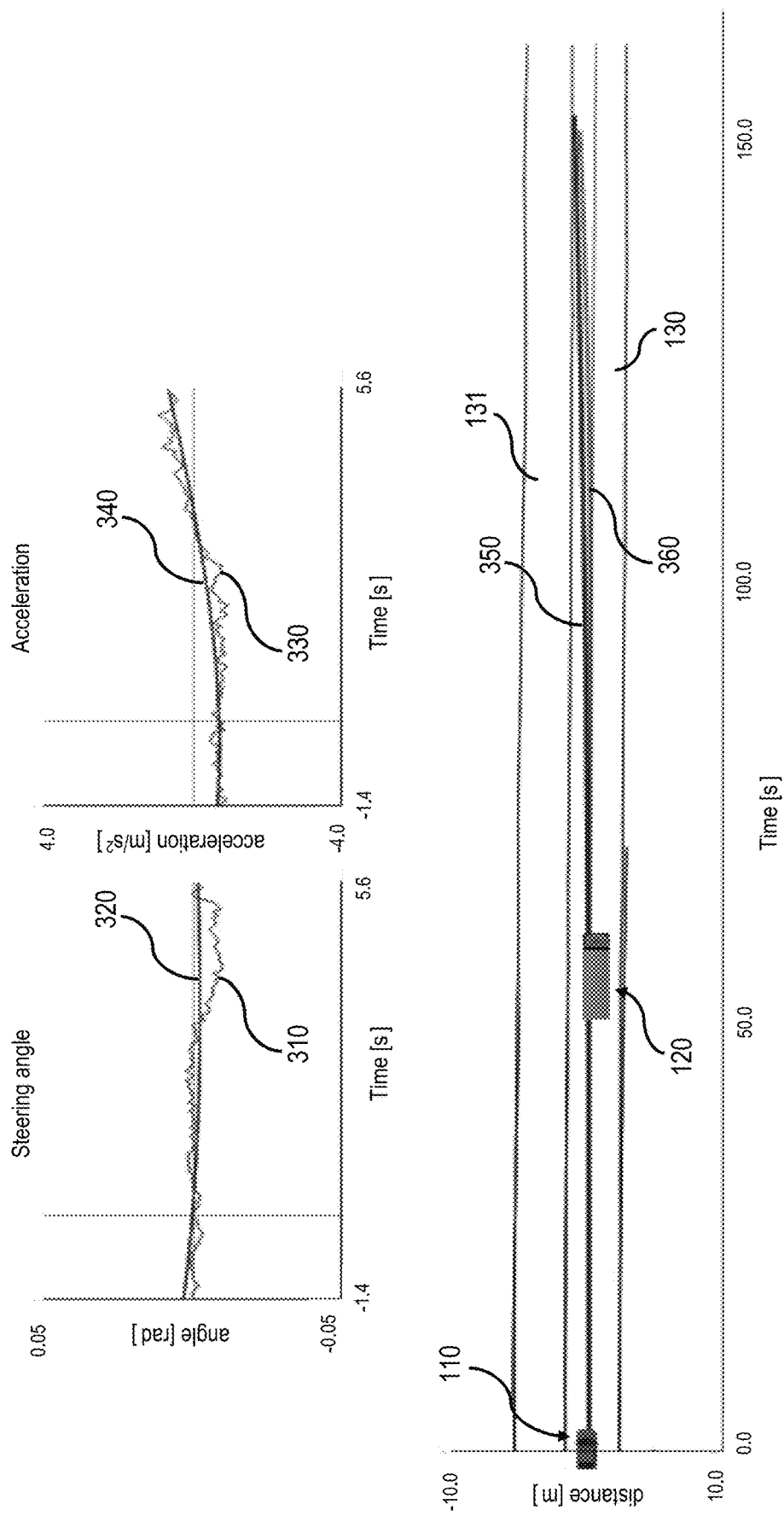
Figure 4:
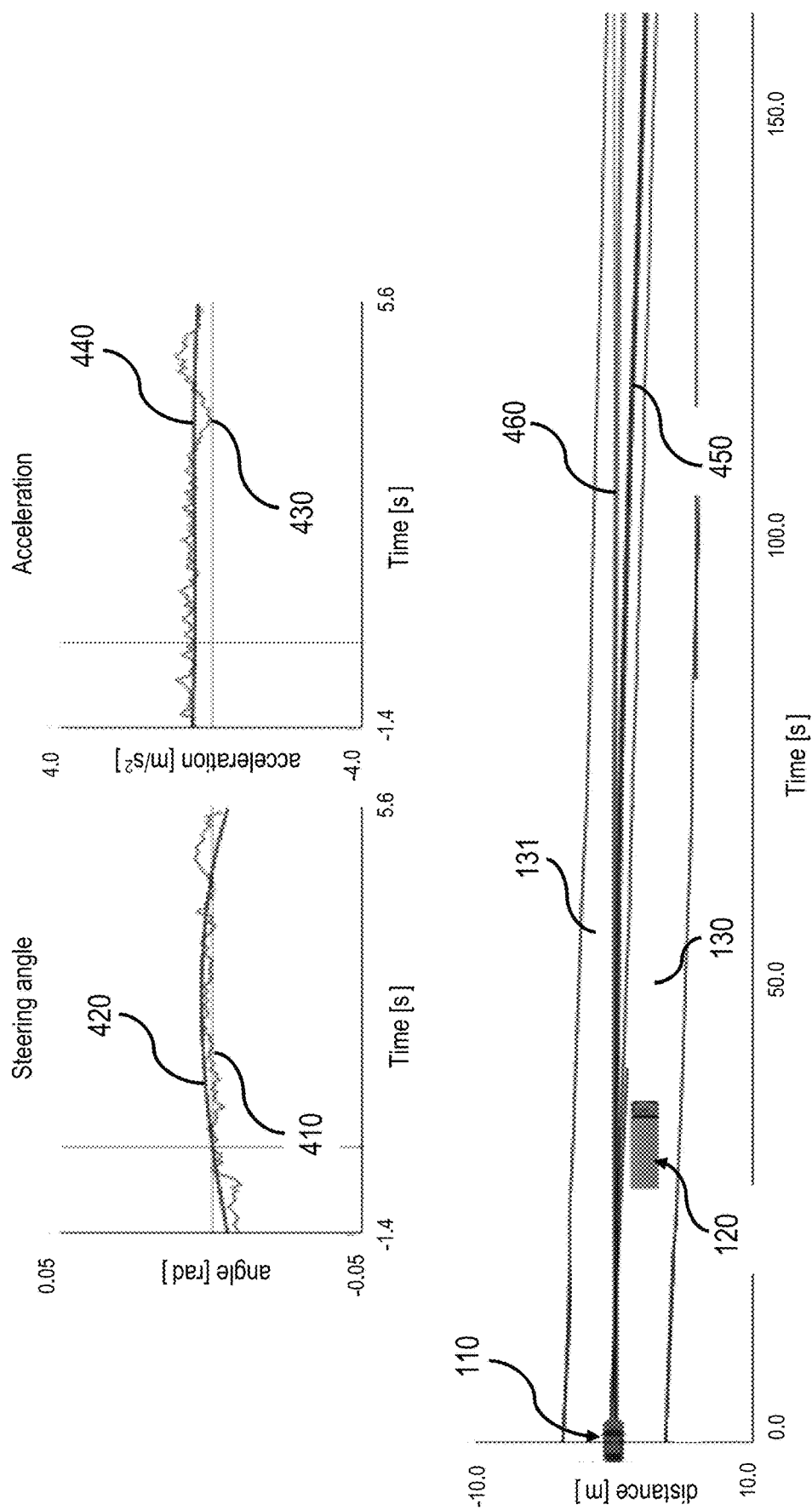
Figure 5:
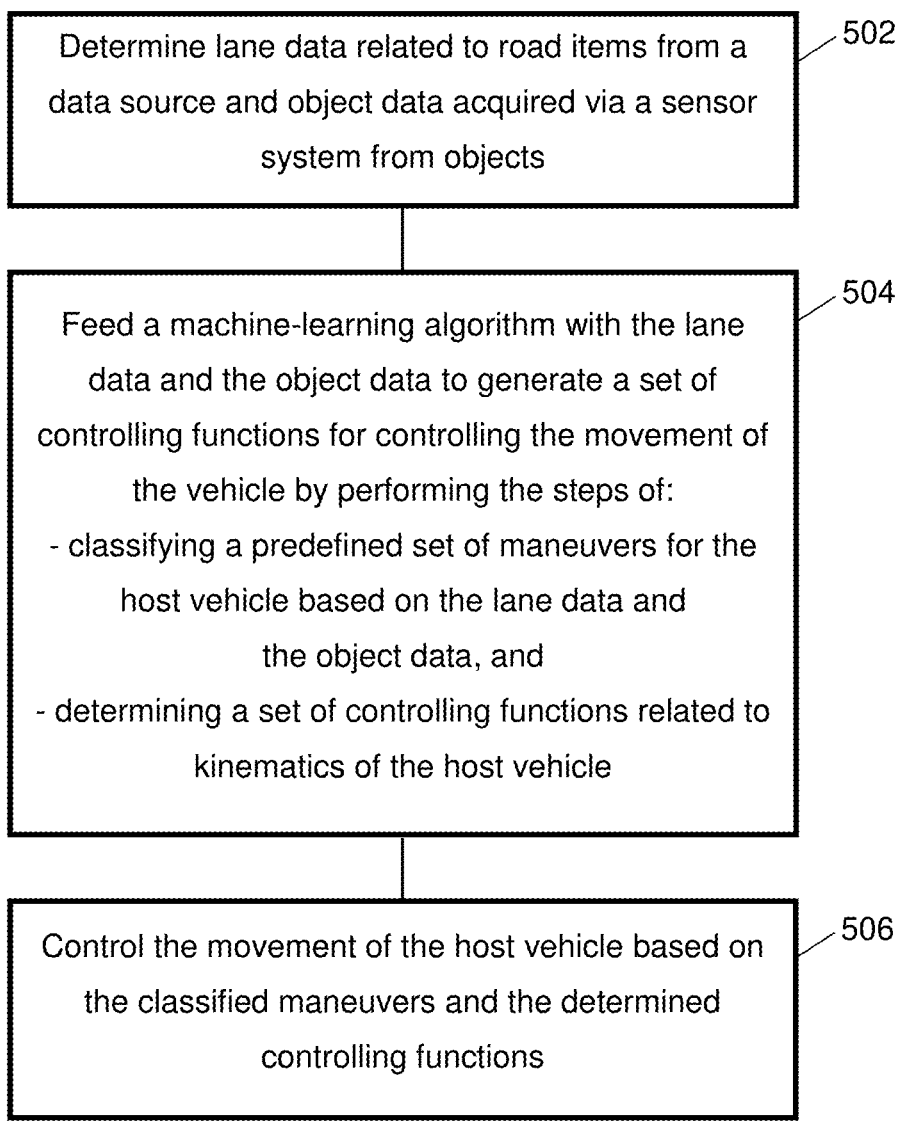
Figure 6:
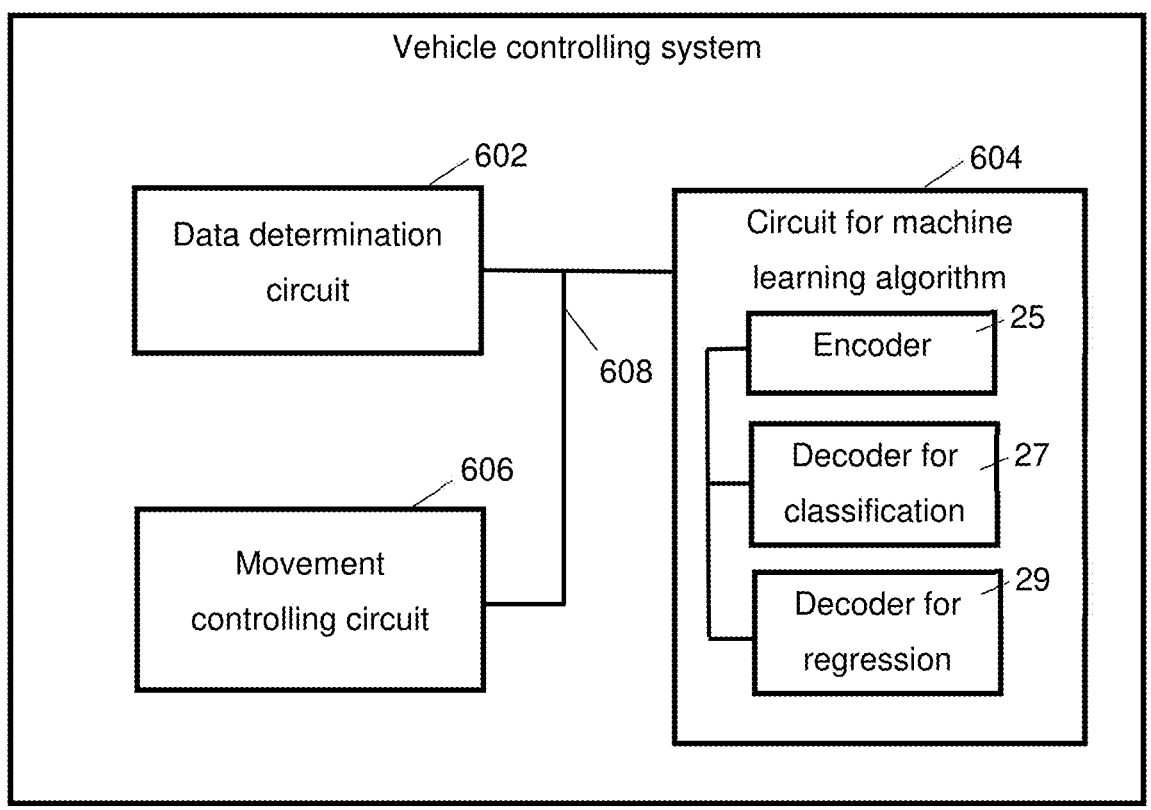

Exemplary embodiments and functions of the present disclosure are described herein in conjunction with the following drawings, showing schematically:

FIG. 1 an illustration of a vehicle including a computer system configured to perform a method according to the disclosure;

FIG. 2 an illustration of the computer system according to the disclosure;

FIG. 3 an example for controlling a host vehicle by performing the method according to the disclosure;

FIG. 4 another example for controlling the host vehicle for a later point in time;

FIG. 5 a flow diagram illustrating a method for controlling the movement of a host vehicle according to various embodiments;

FIG. 6 a vehicle controlling system according to various embodiments; and

Figure 7:
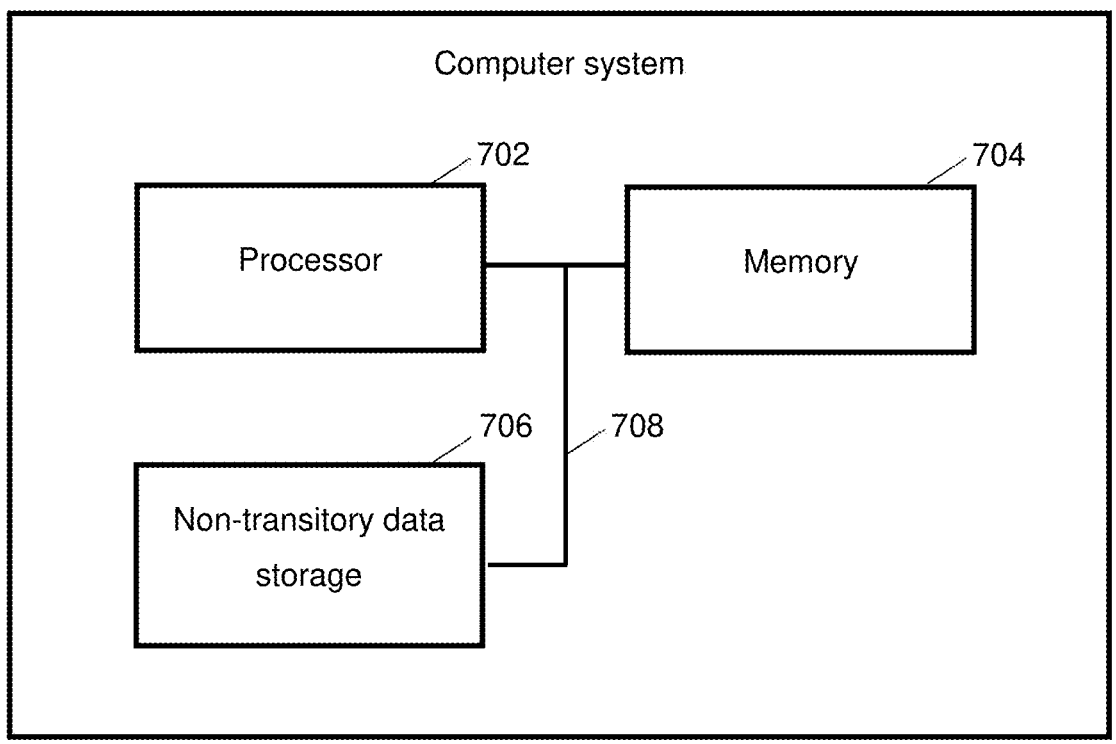

FIG. 7 a computer system including computer hardware components configured to carry out steps of a computer implemented method for controlling the movement of a host vehicle according to various embodiments.

DETAILED DESCRIPTION

FIG. 1 shows an illustration of a host or ego vehicle 110 and of a further vehicle 120 driving in front of the host vehicle 110. Both vehicles 110, 120 are currently driving in a lane 130 which is adjacent to a further left lane 131. In addition, lane markings 132 are depicted for the lanes 130,131, together with right and left road boundaries 135, 136 which may include guard rails, for example.

An arrow 140 indicates the present driving direction and the present speed of the host vehicle 110. According to the related art, a future trajectory of the host vehicle 110 may be predicted, for example, based on given physical properties (like position, velocity, and/or acceleration) of the host vehicle 110 and of further objects located in the external environment of the host vehicle 110 including the further vehicle 120, for example. The future trajectory of the host vehicle 110 may also be influenced by its static context which may for example include the course of the lanes 130, 131, or the like. For example, the vehicle 110 may perform a breaking maneuver for keeping a safe distance to the further vehicle 120, or perform a lane change maneuver to the left (like indicated by arrow 150).

The lane markings 132 and other similar road structures like the guard rails, the road boundaries 135, 136, barriers, are the most important road items which may influence the road users' behavior regarding the future trajectory of the host vehicle 110. Such road items 132, 135, 136 may at least partly represent the traffic rules and may regulate the road user's individual kind of driving behavior into systematic patterns. But even for a relatively simple highway road, modeling such a behavior of road users within their driving environment may already not be easy.

A prediction of the future movements of the host vehicle 110 is a necessary component for many of the vehicle's safety features and for autonomous driving.

FIG. 2 depicts an illustration of a computer system 200 which is configured to carry out a method for controlling the movement of the host vehicle 110. The computer system 200 includes an encoder 210, a classification decoder 220, and a regression decoder 230.

As an input, the encoder 210 receives lane data 211 related to road items, and object data 212 related to properties of objects in the environment of the host vehicle 110. The lane data 211 describes the position of the lane markings 132 (see FIG. 1) relative to the host vehicle 110, for example, and/or the position of the road boundaries 135, 136 relatively to the host vehicle 110, for example, as functions in time.

The lane data 211 related to the road items like the lane markings 132 and/or the road boundaries 135, 136 is determined via a sensor system which is installed in the host vehicle 110. The sensor system includes a visual sensor. Additionally or alternatively, the sensor system may include a radar sensor and/or a Lidar sensor. For an alternative embodiment, the lane data 211 related to the road items may be acquired from a map, wherein map data may be stored in a data base of the vehicle 110.

The lane data 211 is represented as a third order polynomial depending from time. That is, the y-coordinate of a position of a respective road item may be represented by a third order polynomial with the x-coordinate as the only variable, wherein the x- and y-coordinates refer to a vehicle coordinate system having the x-axis along the longitudinal axis of the vehicle 110 and the y-axis along the lateral axis of the vehicle 110.

The lane data 211 also includes the specific type of the road items which are monitored by the sensor system of the vehicle 110, and in addition predetermined ranges for the validity of the lane data 211. In addition or as alternative to the road boundaries 135, 136, the position of guard rails may be observed and tracked by the sensor system of the vehicle 110. The position of the guard rails may also be included in the lane data 211. However, the lane data 211 generally describes the course of the lane 130 in which the vehicle 110 is currently moving, and optionally the course of neighbouring lanes like the lane 131 (see FIG. 1) if such neighbouring lanes are available.

The object data 212 is also detected or determined via the sensor system of the vehicle 110, i.e. via a visual sensor, a radar sensor and/or a Lidar sensor. The object data 212 includes at least the position of objects located in the external environment of the host vehicle 110. Depending from the specific sensor which is applied to acquire the object data, the object data 212 may further include the velocity, the heading angle and further physical properties of the objects like the further vehicle 120 (see FIG. 1) driving in front of the host vehicle 110.

The computer system 200 feeds a machine-learning algorithm with the lane data 211 and the object data 212 in order to perform a classification task of classifying a predefined set of maneuvers for the host vehicle 110, and for performing a regression task of determining continuous functions related to the kinematics of the host vehicle 110. The machine-learning algorithm is realized as a neural network which includes the encoder 210 as well as the classification and regression decoders 220, 230.

The classification task and the regression task both use the common encoder 210 which receives the lane data 211 and the object data 212 as an input. Furthermore, the classification task is performed via the classification decoder 220, whereas the regression task is performed via the regression decoder 230. The output of the classification decoder 220 includes respective probabilities 225 for each of a predefined set of maneuvers which are to be applied for controlling the host vehicle 110.

For the present embodiment, the predefined set of maneuvers for the host vehicle 110 includes a lane change to the left, keeping the lane and a lane change to the right as lateral maneuvers as well as acceleration, keeping speed and deceleration as longitudinal maneuvers. That is, a predefined set of six maneuvers is used by the classification decoder 220 in order to perform the classification task which outputs a respective probability for each of these maneuvers as a function in time for a predetermined time period which is related to the future movement of the vehicle 110.

When performing the regression task, the regression decoder 230 outputs continuous controlling functions 235 in time for kinematic parameters of the host vehicle 110. For the present embodiment, these kinematic parameters are the acceleration and the steering angle of the host vehicle 110. Therefore, the regression decoder 230 outputs a respective continuous controlling function 235 in time for the acceleration and for the steering angle, respectively, in order to control the future movement of the host vehicle 110.

The output of the classification decoder 220, i.e. the probabilities 225 for the vehicle maneuvers, and the output of the regression decoder 230, i.e. the continuous functions 235 for the future acceleration and steering angle, are provided to a vehicle control unit 240 which applies the output 225, 235 of the decoders, i.e. the probabilities 225 and the continuous functions 235, in order to control the future trajectory of the host vehicle 110. As will be explained below in context of FIGS. 3 and 4, the classification decoder 220 and the regression decoder 230 provide their respective output 225, 235 for a predetermined future time period, e.g. five to six seconds, such that the vehicle control unit 240 will be able to adjust the control parameters accordingly, i.e. the acceleration and the steering angle for the present embodiment.

In detail, the output of the classification decoder 220, i.e. the probabilities 225 for the vehicle maneuvers, may be used in different ways by the regression decoder 230 and/or the vehicle control unit 240. For example, the most probable longitudinal and lateral maneuvers, having the highest respective probability 225 for a certain point in time, may be selected and used as an input for the regression decoder 230. Alternatively, the respective most probable maneuvers may be compared with an external input for the maneuver to be performed, e.g. provided by a driver of the vehicle, in order to decide which maneuver may be used as an input for the regression decoder 230 and/or the vehicle control unit 240.

In addition, the continuous controlling functions 235 for the acceleration and for the steering angle can optionally be used for a visualization 250 of the host vehicle's future trajectory. For such a visualization 250, a kinematic bicycle model for the vehicle is applied which is generally known in the art. In FIGS. 3 and 4 below, such future or predicted trajectories 350, 450 are depicted as examples.

In detail, the continuous functions 235 for the acceleration a and the steering angle δ for the future time t are represented by a respective second order polynomial as follows:

$$\alpha(t) = a_\alpha t^2 + b_\alpha t + \alpha_0 \qquad (1)$$

$$\delta(t) = a_\delta t^2 + b_\delta t + \delta_0 \qquad (2)$$

The coefficients $a_\delta$, $b_\delta$ and $a_\delta$, $b_\delta$ are the output of the regression decoder 230 for determining the continuous controlling functions 235. The constants $\alpha_0$ and $\delta_0$ represent the acceleration and the steering angle at the current time, and therefore they are given parameters and no part of the regression task. As an alternative to the second order polynomials, polynomials of a higher order may be used to improve the smoothness of the continuous controlling functions 235.

For another embodiment, the future trajectory of the host vehicle 110 may be modelled directly as fifth order polynomial. In this case, x and y represent the longitudinal position and the lateral position, respectively, of the vehicle 110. The trajectory may be modelled as follows:

$$y(x) = a_y x^5 + b_y x^4 + c_y x^3 + d_y x^2 + e_y x + f_y \qquad (3)$$

In this case, the required coefficients $a_y$, $b_y$, $c_y$, $d_y$, $e_y$ and $f_y$ are output b_y the regression decoder 230 in order to define the continuous controlling function 235 which is given by formula (3). In practice, $f_y$ can be ignored and set to 0 since the coordinate system in which x and y are defined usually has its origin at the center of gravity (or another reference position) of the host vehicle 110.

For a further embodiment, the curvature of the future trajectory may be used for a continuous controlling function 235 which is output by the regression decoder 230. The curvature of the future trajectory is defined as the second derivative of the trajectory as given e.g. by formula (3) and may be represented as follows:

$$y''(x) = 20 a_y x^3 + 12 b_y x^2 + 6 c_y x + 2 d_y \qquad (4)$$

To train the neural network which realizes the machine-learning algorithm for performing the classification task and the regression task, respective kinematic parameters of a real vehicle 110 are used as ground truth. The kinematic parameters, e.g. the acceleration and the steering angle for the present embodiment, are acquired for a certain predetermined time period. Simultaneously, corresponding lane data 211 and object data 212 are acquired and used as input for the encoder 210. The output 225 and 235 of the classification decoder 220 and the regression decoder 230, respectively, is compared with the acquired or logged data for the probabilities 225 of the respective vehicle maneuvers and for the continuous functions 235 of the acceleration and the steering angle in order to determine a respective loss function 226, 236 for the classification task and the regression task, respectively. During training, these loss functions 226, 236 have to be minimized.

For the training of the neural network, one has also to deal with a multi-modality problem if data of a real vehicle 110 are used which are related to a real driver. Different drivers have different driving styles such that one driver will prefer following a slow leading vehicle, whereas another driver will change the lane and perform an overtaking maneuver. This will lead to great differences between the acquired or logged real data for the acceleration and the steering angle as a function in time. For considering such a multi-modality properly, the set of vehicle maneuvers includes the three longitudinal and the three lateral maneuvers only, as described above, i.e. acceleration, keep speed and deceleration for the longitudinal direction and lane change to the left, keeping the lane and lane change to the right for the lateral direction. For considering the multi-modality, the computer system 200 outputs the probabilities 225 for this set of six vehicle maneuvers such that the sum for the probabilities for the longitudinal maneuvers and the sum of probabilities for the lateral maneuvers will each add to 1, respectively, for a certain point in time.

In addition, a so-called "teacher forcing" is applied for the training of the neural network of the computer system 200. The "teacher forcing" uses specific training data with pre-classified longitudinal and lateral maneuvers, and this pre-classified data for the two groups of maneuvers is used as an additional input 260 for the regression decoder 230. The additional pre-classified data 260 is provided to the regression decoder 230 during the training of the neural network only. By this means, the training data or ground truth has one modality only for a certain point in time. This supports the convergence of the regression task which led to the term "teacher forcing" if such a technique is applied. The pre-classified data 260 is fed to the regression decoder 230 only in order not to disturb the classification task which is performed by the classification decoder 220.

The application of the additional pre-classified data 260 may also be regarded as asking the neural network to perform a certain maneuver and to predict the corresponding continuous functions 235 accordingly. That is, a separated and independent maneuver control model is provided as input for training the neural network. Alternatively, the predicted future maneuvers may be used as an output from the classification decoder 220, i.e. provided by the probabilities 225 for the respective maneuvers, which are based on real logged data for the vehicle 110.

FIGS. 3 and 4 illustrate testing results for the computer system 200 and the corresponding method for controlling the movement of the host vehicle 110 according to the disclosure. The steering angle and the acceleration of the host vehicle 110 are selected as kinematic parameters and depicted in the upper part of FIGS. 3 and FIG. 4, respectively.

In detail, the steering angle in rad and the acceleration in m/s$^2$ are predicted by the computer system 200, i.e. by the regression decoder 230 (see FIG. 2) as a function in time. For the prediction, a time period of seven seconds is used which runs from −1.4 s to 5.6 s with respect to the current point in time which is depicted as 0.0 on the x-axis in the lower diagrams of FIGS. 3 and 4, respectively.

For two different current points in time, the respective upper left diagrams of FIGS. 3 and 4 depicts ground truth data 310, 410 for the steering angle over time in seconds, whereas the smooth curves 320, 420 represent the respective prediction output of the regression decoder 230, i.e. the continuous function 235 for the steering angle. Similarly, the respective upper right diagrams depict the ground truth data 330, 430 for the acceleration over time in seconds and the respective predictions 340, 440 which are also output by the regression decoder 230 (see FIG. 2) as continuous function 235 for the acceleration.

At the same time, the classification decoder 220 outputs probabilities 225 for the three lateral maneuvers and for the three longitudinal maneuvers as described above. The probabilities 225 are provided as function in time by the classification decoder 220 for the next 5.6 seconds in the present example which corresponds to the "future time period" for which the steering angle and the acceleration are also predicted by the regression decoder 230.

In the respective lower diagrams of FIGS. 3 and 4, the actual driving scenario for the host vehicle 110 is depicted. In FIG. 3, the host vehicle 110 is located in the right lane 130 and follows a slower further vehicle 120. In detail, the distance of the host vehicle 110 with respect to the center of the lane 130 is plotted over the time in seconds in order to predict and to track the trajectory of the host vehicle 110. A predicted trajectory 350, 450 is shown in the lower part of FIGS. 3 and 4, respectively, with respect to the current location of the host vehicle 110 which is represented by the point in time of 0.0 s. In addition, a respective further trajectory 360, 460 is shown which is derived from the ground truth data for the steering angle and the acceleration as shown in the respective upper part of FIGS. 3 and 4, i.e. derived from the data 310, 410 for the steering angle and the data 330, 430 for the acceleration. In contrast, the predicted trajectories 350, 450 are based on the smooth functions 320, 420 for the steering angle and the smooth functions 340, 440 for the acceleration which are output by the regression decoder 230.

For the situation as shown in FIG. 3, the classification decoder 220 predicts a probability of almost 1 for keep the lane as lateral maneuvers for the current point in time (0.0 s) and for a short time period of about 1.5 s thereafter. Accordingly, the classification decoder 220 predicts a probability of almost 1 for deceleration as longitudinal maneuver since the preceding vehicle 120 having a lower velocity is detected b$_y$ the sensor system of the host vehicle 110. For the present embodiment, the most probable lateral maneuver and the most probable longitudinal maneuver are fed as an additional input to the regression decoder 230. This additional input reflects the driver's behaviour which has been "recorded" during the training phase of the computer system 200. Accordingly, the regression decoder 230 predicts a steering angle of almost 0 and a negative acceleration for the current point in time and the short time period thereafter.

However, after about 1.5-2.0 s with respect to the current point in time of 0.0 as shown in FIG. 3, the prediction of the classification decoder 220 changes drastically for the lateral maneuvers in that the probability for a lane change to the left increases to be predominant, e.g. to approximately 0.9. At the same time, the prediction for the longitudinal maneuvers changes from deceleration to acceleration. Accordingly, the prediction of the regression decoder 230 changes for the steering angle and for the acceleration, as can be seen in the upper part of FIG. 3.

For the scenario as shown in FIG. 4, the host vehicle 110 is located much closer to the further slowly moving vehicle 120. Therefore, the host vehicle 110 starts performing a lane change to the left lane 131 and an overtaking maneuver requesting an acceleration. Correspondingly, the prediction for the steering angle 420 has changed with respect to the prediction 320 as shown in FIG. 3, and accordingly, a strong positive acceleration 440 is predicted.

With respect to the current point in time which is shown at 0.0 in the lower part of FIG. 4, the classification decoder 220 predicts a probability for a lane change to the left for the next 1.5 s, and a probability of almost 1 for acceleration as longitudinal maneuver. Thereafter, the probability for the lane change to the left strongly decreases such that the probability for keeping the lane is almost 1 after approximately three seconds with respect to the current point in time. Since the vehicle 110 is still overtaking the other vehicle 120, the probability for acceleration remains close to 1 for the entire prediction time period of approximately 5.6 s. Accordingly, the prediction of the regression decoder 230 keeps constant for the acceleration 440, whereas the prediction for the steering angle 420 changes in accordance with the predicted maneuver for keeping the lane.

As can be seen in FIGS. 3 and 4, the computer system 200 and the method according to the disclosure are able to predict a proper behaviour regarding the steering angle, the acceleration and the probabilities for the longitudinal and lateral maneuvers. This results in the reasonable predicted trajectories 350, 450 for the host vehicle 110. It is noted that the deviation between the predicted trajectories 350, 450 and the trajectories 360, 460 based on the ground truth data is partly caused by the noisy behaviour of the ground truth data, as can be seen in the curves 310, 410, 330, 430 in the upper part of FIGS. 3 and 4. In addition, the prediction of the neural network including the encoder 210 and the two decoders 220, 230 is subjected to uncertainties such that the ground truth will not be reproduced exactly. Therefore, the deviation between the predicted trajectories 350, 450 and the "ground truth trajectories" 360, 460 is to be expected after a time period greater than about 70 s.

FIG. 5 shows a flow diagram 500 illustrating a method for controlling the movement of a host vehicle according to various embodiments. At 502, lane data related to road items may be determined from a data source, and object data acquired from objects may be determined via a sensor system. The road items and the objects may be located in an external environment of the host vehicle. At 504, a machine-learning algorithm may be fed with the lane data and the object data to generate a set of controlling functions for controlling the movement of the host vehicle by performing the steps of: classifying a predefined set of maneuvers for the host vehicle based on the lane data and the object data, and determining a set of controlling functions related to kinematics of the host vehicle. At 506, the movement of the host vehicle may be controlled based on the classified maneuvers and the determined controlling functions.

According to various embodiments, the step of determining the controlling functions may include predicting control parameters of an acceleration and of a steering angle for the host vehicle.

According to various embodiments, the step of determining the controlling functions may include predicting parameters of a planned curvature for the host vehicle.

According to various embodiments, the data source for determining the lane data may include the sensor system and/or a predetermined map.

According to various embodiments, the set of controlling functions includes continuous functions in time.

According to various embodiments, for training the machine-learning algorithm, common ground truth data may be applied to classify the predefined set of maneuvers and to determine the controlling functions.

According to various embodiments, the common ground truth data may be acquired as data recorded for the host vehicle over a predetermined time period.

According to various embodiments, additional pre-classified data may be generated by pre-classifying the predefined set of maneuvers using the data recorded for the host vehicle, and the additional pre-classified data may be applied for the training of determining the controlling functions.

According to various embodiments, the road items may include lane markings, road boundaries and/or guard rails.

According to various embodiments, the object data may include predefined physical properties of the objects.

According to various embodiments, the predefined set of maneuvers for the host vehicle may include a lane change to the left, keeping the lane and a lane change to the right as lateral maneuvers, and acceleration, keeping speed and deceleration as longitudinal maneuvers.

Each of the steps 502, 504, 506, and the further steps described above may be performed by computer hardware components.

FIG. 6 shows a vehicle controlling system 600 according to various embodiments. The vehicle controlling system 600 may include a data determination circuit 602, a circuit for a machine-learning algorithm 604, and a movement controlling circuit 606.

The data determination circuit 602 may be configured to determine lane data related to road items from a data source and object data acquired via a sensor system from objects. The road items and the objects may be located in an external environment of the host vehicle.

The circuit for the machine-learning algorithm 604 may be configured to feed the machine-learning algorithm with the lane data and the object data to generate a set of controlling functions for controlling the movement of the host vehicle $b_y$ performing the steps of: classifying a predefined set of maneuvers for the host vehicle based on the lane data and the object data, and determining a set of controlling functions related to kinematics of the host vehicle. For performing the above steps of classifying the predefined maneuvers and of determining the control functions, the circuit 604 may include the encoder 25 (see also FIG. 2) which may be used when performing both steps, the decoder for classification 27 which may be used when performing the classifying step only, and the decoder for regression 29 which may be used when performing the step of determining the controlling functions only.

The movement controlling circuit 606 may be configured to control the movement of the host vehicle based on the classified maneuvers and the determined controlling functions.

The data determination circuit 602, the circuit for the machine-learning algorithm 604, and movement controlling circuit 606 may be coupled with each other, e.g. via an electrical connection 608, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

FIG. 7 shows a computer system 700 with a plurality of computer hardware components configured to carry out steps of a computer implemented method for determining an attribute of an object at a pre-determined point according to various embodiments. The computer system 700 may include a processor 702, a memory 704, and a non-transitory data storage 706.

The processor 702 may carry out instructions provided in the memory 704. The non-transitory data storage 706 may store a computer program, including the instructions that may be transferred to the memory 704 and then executed by the processor 702.

The processor 702, the memory 704, and the non-transitory data storage 706 may be coupled with each other, e.g. via an electrical connection 708, such as e.g. a cable or a computer bus or via any other suitable electrical connection to exchange electrical signals. As such, the processor 702, the memory 704 and the non-transitory data storage 706 may represent the circuit for the machine-learning algorithm 604 as described above, i.e. including the common encoder 25, the decoder for classification 27 and the decoder for regression 29 for performing the steps of classifying the predefined maneuvers and of determining the controlling functions, respectively.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the vehicle controlling system 600 and/or for the computer system 700.

REFERENCE NUMERAL LIST 110 host vehicle
120 further preceding vehicle
130 current lane
131 neighboring left lane
132 lane markings
135, 136 road boundaries
140 arrow indicating a present speed of the host vehicle
150 arrow indicating a lane change to the left
200 computer system
210 encoder
211 lane data
212 object data
220 classification decoder
225 probabilities for vehicle maneuvers
226 loss function for the classification decoder
230 regression decoder
235 controlling functions
236 loss function for the regression decoder
240 vehicle control unit
250 trajectory visualization
260 pre-classified data
310 ground truth for steering angle
320 predicted steering angle
330 ground truth for acceleration
340 predicted acceleration
350 predicted trajectory
360 trajectory based on ground truth
410 ground truth for steering angle
420 predicted steering angle
430 ground truth for acceleration
440 predicted acceleration
450 predicted trajectory
460 trajectory based on ground truth
500 flow diagram illustrating a method for controlling the movement of a host vehicle according to various embodiments
502 step of determining data lane data related to road items from a data source, and object data acquired from objects via a sensor system
504 step of feeding a machine-learning algorithm with the lane data and the object data to generate a set of controlling functions for controlling the movement of the host vehicle be performing the steps of: classifying a predefined set of maneuvers for the host vehicle based on the lane data and the object data, and determining a set of controlling functions related to kinematics of the host vehicle
506 step of controlling the movement of the host vehicle based on the classified maneuvers and the determined controlling functions
600 vehicle controlling system
602 data determination circuit
604 circuit for machine-learning algorithm
606 movement controlling circuit
608 connection
700 computer system according to various embodiments
702 processor
704 memory
706 non-transitory data storage
708 connection

The invention claimed is:

1. A computer implemented method for controlling movement of a host vehicle, the method comprising:
determining lane data related to road items from a data source and object data acquired via a sensor system from objects, wherein the road items and the objects are located in an external environment of the host vehicle,
feeding a machine-learning algorithm with the lane data and the object data to generate a set of controlling functions for controlling the movement of the host vehicle by performing the steps of:
 classifying a predefined set of maneuvers for the host vehicle based on the lane data and the object data, and
 determining a set of controlling functions related to kinematics of the host vehicle, and
controlling the movement of the host vehicle based on the classified maneuvers and the determined controlling functions,
wherein:
common ground truth data is acquired as data recorded for the host vehicle over a predetermined time period,
for training the machine-learning algorithm, the common ground truth data is applied to classify the predefined set of maneuvers and to determine the controlling functions,
additional pre-classified data is generated by pre-classifying the predefined set of maneuvers using the data recorded for the host vehicle, and
the additional pre-classified data is applied for the training of determining the controlling functions.

2. The method according to claim 1, wherein the step of determining the set of controlling functions includes:
predicting control parameters of an acceleration and of a steering angle for the host vehicle.

3. The method according to claim 1 wherein the step of determining the set of controlling functions includes:
predicting parameters of a planned curvature for the host vehicle.

4. The method according to claim 1, wherein the data source for determining the lane data includes the sensor system and/or a predetermined map.

5. The method according to claim 1, wherein the set of controlling functions includes continuous functions in time.

6. The method according to claim 1, wherein the road items include lane markings, road boundaries and/or guard rails.

7. The method according to claim 1, wherein the object data include predefined physical properties of the objects.

8. The method according to claim 1, wherein the predefined set of maneuvers for the host vehicle includes a lane change to the left, keeping the lane and a lane change to the right as lateral maneuvers, and acceleration, keeping speed and deceleration as longitudinal maneuvers.

9. A non-transitory computer readable medium comprising instructions which, when executed by a computer system, cause the computer system to perform the computer implemented method of claim 1.

10. A computer system, the computer system being communicatively coupled to a sensor system for providing object data acquired from objects,
wherein the computer system is provided with lane data related to road items and determined from a data source,
wherein the road items and the objects are located in an external environment of a host vehicle,
wherein the computer system is configured to feed a machine-learning algorithm with the lane data and the object data to generate a set of controlling functions for controlling the movement of the vehicle by:

classifying, with a classification decoder, the predefined set of maneuvers for the host vehicle based on the lane data and the object data, and determining, with a regression decoder, the set of controlling functions related to kinematics of the host vehicle, wherein:

the classification decoder and the regression decoder are separate decoders for the classification and regression tasks, respectively, and additional pre-classified data is provided to the regression task only, the computer system comprises a vehicle control unit configured to control the movement of the host vehicle based on the classified maneuvers and the determined controlling functions, common ground truth data is acquired as data recorded for the host vehicle over a predetermined time period, for training the machine-learning algorithm, the common ground truth data is applied to classify the predefined set of maneuvers and to determine the controlling functions, additional pre-classified data is generated by pre-classifying the predefined set of maneuvers using the data recorded for the host vehicle, and the additional pre-classified data is applied for the training of determining the controlling functions.

11. The computer system according to claim 10, wherein the machine-learning algorithm includes an encoder which is used when classifying the predefined set of maneuvers and determining the set of controlling functions.

12. A vehicle comprising the computer system of claim 10.

* * * * *